(12) United States Patent
Rezvani et al.

(10) Patent No.: US 7,149,798 B2
(45) Date of Patent: Dec. 12, 2006

(54) METHOD AND SYSTEM FOR ADAPTIVELY SETTING A DATA REFRESH INTERVAL

(75) Inventors: Babak Rezvani, New York, NY (US); Jack L. Chen, Astoria, NY (US)

(73) Assignee: Xanboo, Inc., New York, NY (US)

( * ) Notice: Subject to any disclaimer, the term of this patent is extended or adjusted under 35 U.S.C. 154(b) by 510 days.

(21) Appl. No.: 09/773,148

(22) Filed: Jan. 31, 2001

(65) Prior Publication Data
US 2002/0103897 A1 Aug. 1, 2002

Related U.S. Application Data

(60) Provisional application No. 60/230,315, filed on Sep. 6, 2000.

(51) Int. Cl.
G06F 15/173 (2006.01)
H04H 7/16 (2006.01)

(52) U.S. Cl. .............................. 709/224; 725/9; 725/17

(58) Field of Classification Search ................ 709/203, 709/217–219, 224, 223; 348/143; 725/9, 725/17, 44
See application file for complete search history.

(56) References Cited

U.S. PATENT DOCUMENTS

| | | | |
|---|---|---|---|
| 5,907,681 A * | 5/1999 | Bates et al. .................. | 709/228 |
| 6,032,182 A * | 2/2000 | Mullen-Schultz ........... | 709/223 |
| 6,138,150 A * | 10/2000 | Nichols et al. .............. | 709/219 |
| 6,218,953 B1 * | 4/2001 | Petite .......................... | 340/641 |
| 6,470,386 B1 * | 10/2002 | Combar et al. ............. | 709/224 |
| 2002/0032637 A1 * | 3/2002 | Moshal et al. ................ | 705/37 |

OTHER PUBLICATIONS

Axis, "Network Camera Developments Enable Live Web Imaging", AXIS 2100 White Paper, Nov. 12, 1999, pp. 1-12.*
Schumaker, J., "Product Review—The Axis 2100 Network Camera", Linix Journal, Aug. 16, 2000, pp. 1-4 (as printed).*

* cited by examiner

*Primary Examiner*—Frantz B. Jean
(74) *Attorney, Agent, or Firm*—Kenyon & Kenyon LLP

(57) ABSTRACT

A method and system is disclosed for adaptively refreshing a data using system. The data using system includes a data source and a data using device for utilizing data from the data source. The data using device has an initial refresh interval. A communication link is provided between the data source and the data using device. A criteria monitor is provided for monitoring at least one criteria related to the refresh interval. A processor is provided for generating an updated data refresh interval based at least in part on the monitored criteria. The updated data refresh interval is transferred to the data using device. The data using device is also updated based on the data refresh interval.

38 Claims, 4 Drawing Sheets

METHOD AND SYSTEM FOR ADAPTIVELY SETTING A DATA REFRESH INTERVAL

CROSS-REFERENCE TO RELATED APPLICATIONS

The present application claims the benefit of U.S. Provisional Patent Application No. 60/230,315, filed on Sep. 6, 2000.

BACKGROUND OF THE INVENTION

The invention relates to systems and methods for setting a data interval for a data using entity, and more particularly, the invention relates to systems and methods for adaptively setting a data refresh interval for a data using entity, such as an Internet web browser.

In today's information-centric and fast-paced world, information and data is plentiful and readily available. It is often critical for a user to have the most current data available, especially where the data is sensitive and/or changes quickly. This is especially so, when the user is using the data to control or otherwise affect the behavior of some other object, such as a piece of equipment located at a remote location. As such, it is typically necessary to refresh data being used by a data using entity, such as a data display, a database, a dynamically generated web page, or the like at an interval that is appropriate for the data. Setting the refresh interval too short will typically result in inefficient allocation of network bandwidth and processor resources, while setting the refresh interval too long might result in stale data.

It is therefore an object of the present invention to provide improved systems and methods for adaptively setting a data refresh interval for a data using entity.

SUMMARY OF THE INVENTION

This and other objects of the invention are accomplished in accordance with the principles of the present invention by providing a method and system for adaptively refreshing a data using system. The data using system includes a data source and a data using device for utilizing data from the data source. The data using device has an initial refresh interval. A communication link is provided between the data source and the data using device. A criteria monitor is provided for monitoring at least one criteria related to the refresh interval. A processor is provided for generating an updated data refresh interval based at least in part on the monitored criteria. The data using device is updated based on the data refresh interval.

In one form of the invention, the communication link is a network or a global computer network. The data using device can be a web browser.

In one form of the invention, a database is provided for storing the data received from the data source. A device, such as a web server, is provided for generating display pages based at least in part on the data stored in the database and which are viewable on the data using device.

In another form of the invention, the one or more criteria are selected from the group comprising the likelihood that the data using entity will receive a large amount of data, the available bandwidth of the communications network, the closeness of the client to the part of the web site containing a source of data, the ability of the server to process data, client usage patterns, database usage patterns, and the nature of the data.

In one form of the invention, the updated refresh interval is transmitted to the data using device which uses the updated refresh interval to determine when to refresh the device. In another form of the invention, the data using means requests data from the data server and the data server transmits the updated refresh interval in a response to the data server's request for data. Subsequent requests for data by the data using device are based at least in part on the updated refresh interval.

BRIEF DESCRIPTION OF THE DRAWINGS

For a more complete understanding of this invention, reference should now be made to the embodiment illustrated in greater detail in the accompanying drawing and described below. In the drawings.

DETAILED DESCRIPTION OF THE PREFERRED EMBODIMENT

Figure 1:
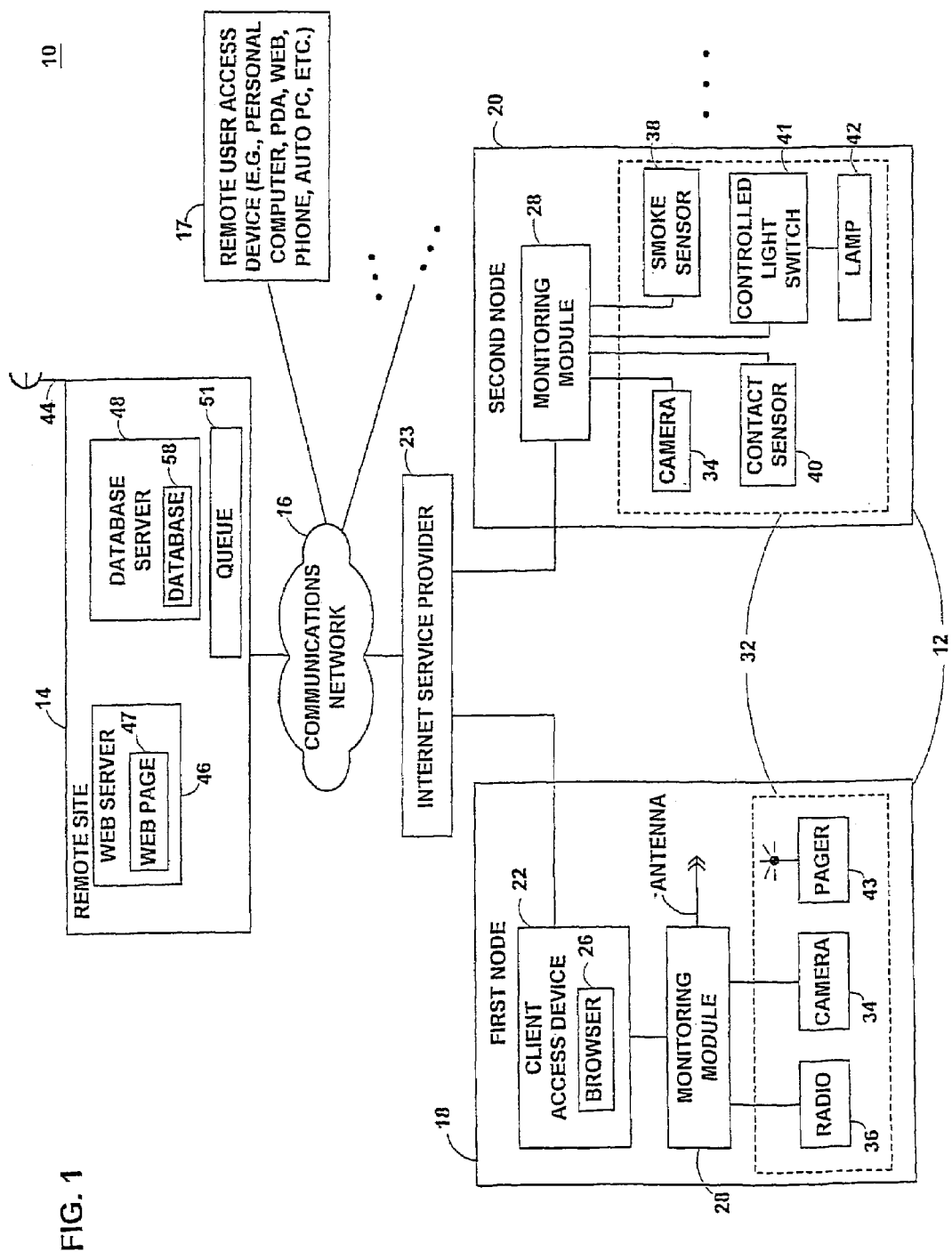
FIG. 1 is a block diagram of an illustrative system for adaptively refreshing a display in accordance with an embodiment of the present invention.

FIG. 1 shows an illustrative system 10 in accordance with the present invention. For purposes of clarity, and not by way of limitation, an illustrative client-server based embodiment of the present invention is herein described. System 10 may include an installation 12 and a remote site 14 that may be linked via a communications network 16. In practice, there may be more than one remote site 14 and installation 12, but only one each is shown to avoid over-complicating the drawing. Remote site 14 may be any suitable remote site that may include equipment such as, for example, one or more servers, mainframes, personal computers, or any other suitable computer-based equipment. Remote site 14 may include a network of suitable computers that may be interconnected in any suitable way, such as, for example, through a local area network, wide area network, telephone network, cable television network, Intranet, Internet, or any other suitable wired or wireless communications network. Communications network 16 may be any suitable communications network, such as, for example, a local area network, wide area network, telephone network, cable television network, Intranet, Internet, or any other suitable wired or wireless communications network. Some suitable wireless communications networks may be global system for mobile communications (GSM), time-division multiple access (TDMA), code-division multiple access (CDMA), Bluetooth, or any other suitable wireless communication networks. Installation 12 and remote site 14 may communicate over communications network 16 using any suitable protocol or protocol stack. For example, installation 12 and remote site 14 may communicate via a transmission control protocol/Internet protocol (TCP/IP) environment using, for example, IP version 4 or IP version 6 (that supports 128-bit network addressing) and a hypertext transfer protocol (HTTP). In another approach, universal plug and play (UPnP) technology may be used to allow communication between installation 12 and remote site 14. Any suitable request-response type of protocol and socket-based packet transport stack, or suitable peer-to-peer communications approach may be used as desired.

Installation 12 and remote site 14 may communicate using any suitable communications. Communications may include, for example, commands, requests, messages, remote procedure calls (e.g., using a proxy-stub pair), or any other suitable client-server or peer-to-peer communication. Communications may also involve, for example, complex communications between application constructs running on installation 12 and remote site 14. Objects running on the client and server may, for example, communicate using an Object Request Broker (ORB). Transmitted information may, for example, be encapsulated as COM objects or Javabeans and persisted to files that are transmitted over a remote access link. In another suitable approach, access communications may include hypertext markup language (HTML) formatted markup language documents (e.g., web pages), that are exchanged between installation 12 and remote site 14 via ISP 23 and communications link 16. For example, communications may consist of a series of HTTP posts and responses in which the parameters for the transmissions may be sent as name/value pairs in the normal post method. In order to achieve the result of transmitting multiple commands in a single command string, numbered commands may be parsed out and executed at remote site 14. Remote site 14 may be responsible for parsing the command string into individual commands and executing each of those commands. In order to achieve this task of parsing the commands, remote site 14 may utilize a script language and interpreter such as Personal Home Page Tools (PHP) which is embedded within a Web page along with its Hypertext Markup Language (HTML). For example, before a page is sent to the requesting user, the Web server may call PHP to interpret and perform the operations called for. Other similar technologies may also be utilized such as JavaScript, Microsoft's VBScript, or any other applicable script interpreter.

If desired, any other suitable client-server or peer-to-peer based approach may be used.

Installation 12 may be operated by a local user. Installation 12 may include one or more nodes. For purposes of illustration, FIG. 1 illustrates an approach having two nodes, first user node 18 and second user node 20. It should be understood that nodes 18 and 20 may be located at a single location, such as the user's main residence. If desired, nodes may be located across more than one location. For example, one node may be in a user's main residence and another at the user's vacation house.

In one embodiment of the present invention, user node 18 may include a client device 22 that may be connected to communications network 16. In Internet-based approaches, such as, for example, as in the embodiment shown in FIG. 1, client device 22 may be connected to the Internet via an Internet service provider (ISP) 23. Client device 22 may be any device suitable for communicating with remote site 14 via communications network 16. For example, client device 22 may be a computer, a personal digital assistant (PDA), a terminal, a set-top box, or any other suitable device that provides access to remote site 14 via communications network 16. Client device 22 may include, for example, an Internet browser application 26 that may be used to access web pages via communications network 16. In other suitable approaches, client device 22 may run a client application that provides locally generated displays propagated with a format obtained using any suitable client-server or peer-to-peer scheme.

Client device 22 may communicate with ISP 23 or directly with communications network 16 using any suitable communications link. For example, the link may include a telephone dial-up link, digital subscriber lines (DSL), a cable modem link (e.g., a data over cable service interface specification (DOCSIS)), a satellite link, a computer network link (e.g., Ethernet link, T1 line, etc.) or any other suitable communications link or combination of communications links.

Remote site 14 may include one or more servers such as, for example, web server 46 and database server 48. Database server 48 may maintain database 58. In other suitable approaches, such as non-Internet based approaches, remote site 14 may include an application server and any other suitable server or combination of servers. As herein used, the term "server" is not limited to a distinct piece of computing hardware or storage hardware, but may also be a software application or a combination of hardware and software. For example, one computer may have software that enables the computer to act as both a web server and as a database server.

In some suitable approaches, remote site 14 may provide displays or display definitions to client device 22. In the Internet-based approach of FIG. 1, for example, web server 46 may generate static and dynamic web pages from data supplied by database server 48. Web page 47 may be viewed by a user using Internet browser 26 running on client device 22.

Software applications interfacing installation 12 with remote site 14 may be created using any suitable platform and/or software development tools. For example, Java 2 Enterprise Edition, Javabeans, component object model (COM) based technologies (e.g., ActiveX, object linking and embedding (OLE), etc.), Javascript, Visual Basic, C, C++, scripting languages, or any combination of these or other suitable development tools may be used in creating the software interface between installation 12 and remote site 14 (e.g., web-page interface). Any combination of these or other suitable development tools may be used in preparing any other software modules or applications for use in any other suitable facet of the present invention.

Remote site 14 may function as the master controller of the system shown in system 10. In addition, users may access the system shown in system 10 via any computer, monitoring module, or remote user access device linked to communications network 16. Remote user access devices (such as remote user access device 17 in FIG. 1) may include, for example, personal digital assistants, cellular telephones, set-top boxes, personal computers, or any other suitable device a user may use to access remote site 14 via communications network 16.

Monitoring modules 28 may serve as an interface between remote site 14 and at least one connected device 32. Monitoring modules 28 may be any suitable hardware, software, or a combination thereof and may be included at any point within the system. For example, monitoring module 28 may be a software application running on client device 22 or a separate piece of hardware that may be connected to client device 22 (as shown at node 18) or partially implemented as software on client device 22 and a separate piece of hardware. In some embodiments, monitoring module 28 may be a stand-alone appliance (as shown at node 20) connected to communications network 16, operating separately and independently from client device 22. Each monitoring module may be shipped with a model identification code, or with the capacity to generate such a code, that may serve to identify each particular monitoring module's model type.

One or more monitoring modules or service brokers may be installed at one or more locations. Monitoring modules may be installed by the user (or any other suitable person) by, for example, connecting the modules to client device 22 that may communicate with remote site 14 over communications network 16. The connection between the monitoring module and the client access device and between devices and the monitoring module may be in the form of a universal serial bus (USB) connection, parallel port connection, serial connection (e.g., RS-232), Firewire connection, any combination of these, or any other suitable type of connection. If desired, monitoring modules may be given the capability (e.g., processing hardware, communications equipment, etc.) to communicate, via communications network 16, without the use of a client access device. Monitoring modules may link attached devices or appliances (e.g., sensors, cameras, microwaves, refrigerators, etc.) with remote site 14 via communications network 16. One or more monitoring modules 28 may provide data from attached devices and appliances to remote site 14 via communications network 16. The term "device," as defined herein, shall include any suitable device or appliance.

At least one device 32 may be interfaced with and controlled by each monitoring module 28. Connections between monitoring module 28 and the various devices 32 may be hardwired or wireless (e.g., using Bluetooth technology). Devices 32 may encompass any suitable device capable of being controlled or mediated by an external controller. Such devices may include, but are not limited to, a camera 34, a radio 36, a smoke or fire detector 38, a contact sensor 40, and a light switch 41. Although not illustrated, other suitable devices may include, for example, various audio input and output devices, various visual displays, washers/driers, microwave ovens, cooking ranges, car alarms, plant watering devices, sprinkler, thermostats, carbon monoxide sensors, humidistats, rain gauges, video cassette recorders, radio tuners, or any other suitable device and the like.

One or more notification devices, such as pager 43, may also be incorporated into the system. As illustrated in FIG. 1, pager 43 is in wireless communication with a wireless or cellular transmitter 44 associated with remote site 14. Other suitable notification devices include, for example, e-mail clients, wireless hand-held computers, wireless wearable computer units, automatic web notification via dynamic web content, telephone clients, voice mail clients, cellular telephones, instant messaging clients, and the like.

System 10 provides users with opportunities to remotely control and monitor devices 32 using remote user access devices 17 via communications network 16. In the example of FIG. 1, users may control devices 32 that are interfaced with monitoring modules 28 at node 18 and devices 32 interfaced with monitoring module 28 at node 20. In practice, there may be a single node, or more nodes, depending on, for example, the user's equipment, number of sites, or other suitable parameters. In practice, a suitable system architecture and communications network 16 may allow users, or anyone that users permit, to readily monitor and control monitoring modules 28 from any location using any suitable device that is capable of communicating with remote site 14 via communications network 16.

In another suitable approach, users may access installation 12 using remote user access devices 17 without the use of remote site 14. For example, remote user access devices 17 may be used to communicate with monitoring modules 28 of installation 12 via communication network 16 and ISP 23. If desired, two-way communications may be implemented using this approach. Remote user access device may access installation 12 using, for example, special IP addresses assigned to a particular monitoring module, node, installation, or any other suitable element of the installation. The use of IP addresses is merely illustrative. Any other suitable addressing may be used to allow access to an installation from a remote used access device.

Devices 32 may be programmed at the installation in terms of how they respond to certain events (e.g., what does the camera do when the contact sensor is triggered?). Alternatively, devices 32 may be programmed from a remote location using remote user access device 17, for example. The programming may be stored in devices 32, monitoring modules 28, or at remote site 14.

The following examples of the uses of illustrative devices will illustrate the operation of the present invention. For example, contact sensor 40 of FIG. 1 may be associated with the front door (not shown) of a remote location associated with second node 20. Contact sensor 40 may be configured to trip whenever the front door is opened. Camera 34 is also positioned to view the front door location and may be programmed to take a digital picture whenever the sensor contact 40 is tripped. This picture may be transmitted over communications network 16 and stored in database server 48. When contact sensor 40 detects that the front door has been opened, an event notification or alarm trigger may be transmitted by monitoring module 28 to database server 48. Database server 48 may have been previously programmed to transmit a notification event to the user's pager, for example, via cellular transmitter 44. As the contact sensor is tripped, camera 34 may take a picture of the front door and may transmit that picture, via monitoring module 28 and communications network 16, to database server 48. The user, having been notified via pager 42, may now access the picture using web server 46 of remote site 14 via Internet browser 26. In this way, the user may determine who has entered the front door of his or her home.

As another example, system 10 may allow a user located at one node 18 to control a device at a second node 20. The user may contact web server 46 via, for example, Internet browser 26 of node 18 in order to access a database entry for light switch 41 of node 20. A virtual representation of the light switch 41 may be made available to the user by web server 46 and may be manipulated by the user to remotely change the state of light switch 41 and the connected lamp 42. For example, the system may allow the user to change the state of lamp 42 from being "off" to being "on" by, for example, manipulating the virtual light switch from web server 46 and a corresponding command would be placed in the queue of waiting commands on the server component.

Periodically, the controlling module or monitor 28 may poll remote site 14 looking for waiting commands, such as the change state command of light switch 41. Thereafter, the command may be transmitted to monitoring device 28 that would instruct the light switch to change from the "off" state to the "on" state, thus turning on lamp 46. This change in state of lamp 46 may be viewed by an appropriately positioned camera, such as camera 34, which would be used to visually monitor the remote location 20 to determine whether the command had been completed successfully. If the command had not been successfully completed, then an error message may be communicated to the user, using for example, the means specified by the user's notification preferences or through any other suitable means of communicating information to the user. This is merely an illustrative approach for detecting a change is state of a device. In another suitable approach, lamp 46 may be in two-way communications with a corresponding device driver. The device driver may query the lamp to determine whether it was on after executing a "turn on" command. Any such suitable approach may be used for detecting a state in change of a device.

Figure 2:
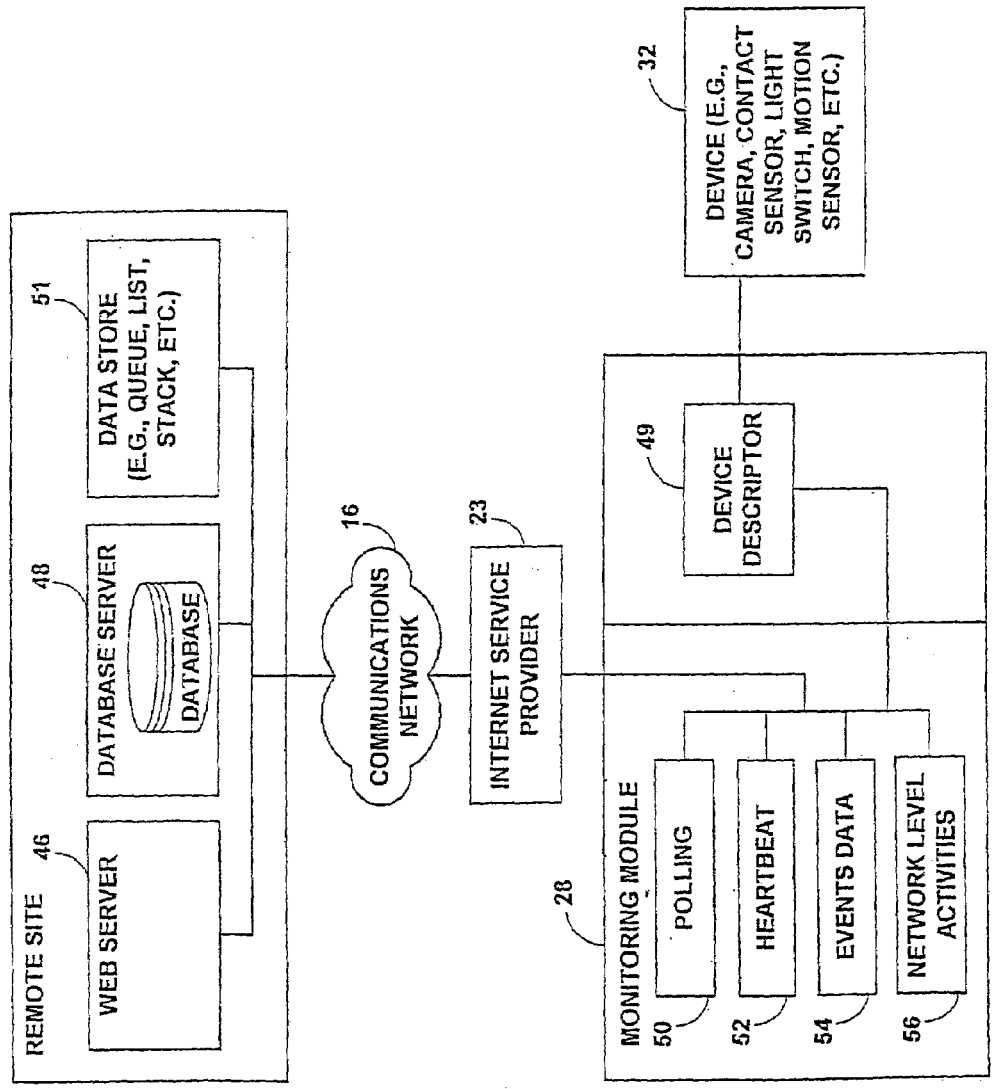
FIG. 2 is a block diagram of some of the components of the illustrative system for adaptively refreshing a display of FIG. 1 in accordance with an embodiment of the present invention.

Referring now to FIG. 2, monitoring module 28 may serve, for example, as a common connection point for one or more devices 32 at an installation 12 and as the interface between devices 32 and remote site 14 via communications network 16. Monitoring module or service broker 28 may, for example, serve as a translation and brokering agent between remote site 14 and devices 32.

In one suitable embodiment, monitoring module 28 may be software made up of multiple dynamically loaded objects, or device descriptors 49, that may allow remote site 14 to interface with the devices 32. The dynamically loaded device descriptors 49 may act as device drivers for devices 32, translating, in both directions, monitoring, command, and control data exchanged between monitoring module 28 and remote site 14 via communications network 16. Each device descriptor 49 may also translate the signals received from monitoring module 28 into the specific electrical signals that are required to communicate with (both input and output) and control its associated device 32. Device descriptor 49 may be provided for each specific device 32 when, for example, different devices 32 have different interfaces and require specific sets of electrical signals for their monitor and control.

Device descriptors 49 may include, for example, a manufacturer identification, product identification, and driver version number to allow a device to be referenced correctly. Once a new device 32 has been detected and is to be integrated into the system, monitoring module 28 may reference, download, and run the appropriate drivers for the new device.

After loading a new descriptor 49, monitoring module 28 may communicate with remote site 14 to determine whether device 32 has been previously catalogued. Monitoring module 28 may, for example, determine if a general description and a default state of device 32 exists at the remote site. When a device 32 has been catalogued, then, for example, static parameters, such as the manufacturer name, may be communicated from monitoring module 28 to remote site 14 and the default state of device 32 may exist at remote site 14. When a device 32 is not already catalogued, device 32 may communicate its default state and static parameters to monitoring module 28 that may, in turn, communicate the default state and static parameters to remote site 14. The communication from monitoring module 28 to remote site 14 may be done using name/value pairs using, for example, the normal HTTP post method discussed hereinbefore. For example, a template document may be a static parameter of device 32.

Figure 3:
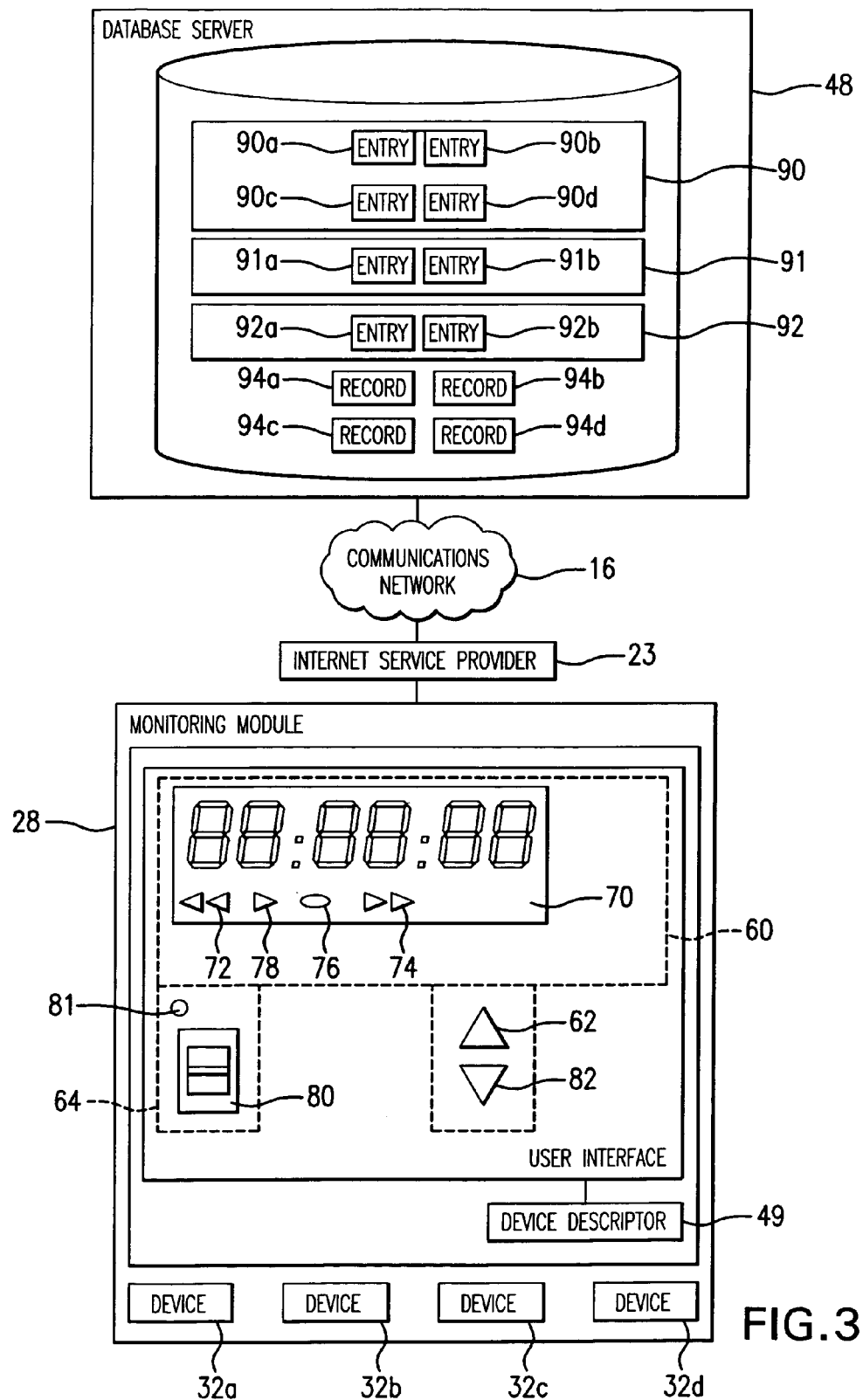
FIG. 3 is a block diagram of some of the components of the illustrative system for adaptively refreshing a display of FIG. 1 in accordance with an embodiment of the present invention.

FIG. 3 shows five devices, 32, 32a, 32b, 32c, 32d. In practice, there may be more or fewer devices with each installation. Each device may be interfaced to a monitoring module 28 via a device descriptor or driver 49 (only one shown). Each device may include a customizable user interface 58 that may be viewable on a remote user access device over communications network 16. Interfaces 58 may include virtual representations of the actual user interfaces of the devices.

In another approach, virtual representations may be stored on, for example, web server 46. Remote site 14 may use changes in device states to change the virtual representations of the devices with which the changed states are associated. A virtual representation of a device, as previously described, may be either a text-based, symbol-based, or image-based representation of an actual device 32 from the installation as it appears to a user who accesses the remote site from a location remote to the installation using any suitable remote user access device. For example, if the device is a light switch, the corresponding virtual representation may be an indicator icon that may be either green or red. If the indicator icon is green, that may denote that the actual light switch is in the "on" position. If the indicator is red, that may denote that the light switch is in the "off" position. If, during a heartbeat operation, remote site 14 is informed that the state of the light switch changes from "on" to "off," then the virtual representation of the light switch may change from being green to being red.

User interface 58 may include at least one resource. In the example of FIG. 3, resources 60, 62, and 64 are shown. Resources may provide users with access to features specific to their associated device. For example, the device shown in FIG. 3 represents a videocassette recorder (VCR) having a recording setting resource 60, a channel selecting resource 62, and a power selecting resource 64. Typical VCRs may have other operational resources, but the resources illustrated in FIG. 3 are sufficient to illustrate the operation of the device.

Each resource 60, 62, 64 may include one or more display components. For example, the recording setting resource 60 includes a display component 70 and a series of pushbuttons 72, 74, 76, 78 which a user may use to activate the VCR's fast forward, reverse, play, and stop functions, respectively. The channel selecting resource 62 may include the display component 70 and a pair of pushbuttons 82 that users may use to activate up channel and down channel functions of the VCR. The power selecting resource 64 may include a toggle switch 80 that user may use to activate the VCR's power on and power off commands, and an LED indicator 81 that may indicate the power condition of the VCR.

Other suitable display components may include toggle buttons, radio buttons, absolute sliders, proportional sliders, edit fields, labels, images, video clips, streaming video, streaming audio, multiselect list, time fields, date fields, N-directional components, N-state buttons, N-state selectors (where N may be any suitable integer), trees, tables, graphs, charts, drawing pads, streaming audio, banners, or any other suitable display components. Display components may act as status indicators. If desired, display components allow users to toggle settings or otherwise manipulate devices 32. For example toggle buttons may serve as indicators, showing, for example, whether a device is in the "on" position or in the "off" position. Toggle buttons may allow users to change the state of a device, by, for example, turning a device on or off. Sliders may act as indicators by showing, for example, the percentage complete of a particular process a device may be performing (e.g., baking a cake), and may allow users to change the state of a device (e.g., changing the thermostat temperature). Edit fields may allow users to change textual representations of suitable elements (e.g., naming a television show to be recorded by the show's name). Video, audio, images, or any other suitable media-based components may act as indicators showing what the devices are sensing (e.g., images may be sensed by cameras, streaming video may be sensed by camcorders, audio clips may be sensed by audio recorders, etc.). Date and time fields may act as indicators, by, for example, displaying what date and time a VCR is set to start recording. Date and time fields may allow users to set the date and time a VCR may start recording. Multiselect lists may act as indicators by, for example, listing all sound sensors that are detecting noise in the house. Multiselect lists may also be used, for example, to select some of a number of available sensors to turn on.

A virtual representation of each device 32, 32*a*, 32*b*, 32*c*, 32*d* may be stored as a record 94, 94*a*, 94*b*, 94*c*, 94*d* in the database of database server 48 of remote site 14. Each record may contain an entry for each resource and its associated components which make up the device. For example, record 94 for VCR device 32 may contain an entry 90, 91, 92 for each resource 60, 62, and 64, respectively, and an entry 90*a*, 90*b*, 90*c*, 90*d*, 91*a*, 91*b*, 92*a*, and 92*b* for each component 70, 72, 72, 74, 80, 81, and 82, respectively. In addition, a web page 47 may be generated by web server 46 by extracting the associated record for that device from database server 48 and creating a graphical, textual, tactile, aural, or other similar modality user interface representation of that device that the user may access via, for example, Internet browser 26.

One of the functions that monitoring module 28 may serve is to persist the state of devices 32. This may be done, for example, to allow the real-time states of devices 32 to be stored, to communicate to remote site 14, or to allow for easy recovery from a system crash.

The stored state of devices 32 may also be used for maintaining a synchronized relationship between an installation 12 and remote site 14. In one possible embodiment of the present invention, remote site 14 and installation 12 may use polling and heartbeat mechanisms in order to synchronize state information between remote site 14 and installation 12. Polling may refer to a process whereby monitoring module 28 obtains commands from remote site 14. The commands may reside, for example, in command queue 51. Commands may be accumulated at command queue 51 as a result of any suitable action by the user, by remote site 14, or by both. For example, a user may use a remote user access device to issue a command or a request to remote site 14 to cause a change in state of one of devices 32 (e.g., to turn a lamp on). Remote site 14 may post the change in state command to a command queue 51.

Monitoring module 28 may communicate a request for pending commands to remote site 14. This request may be communicated periodically as part of the polling process. In response to the monitoring module's request, remote site 14 may provide one or more pending commands from command queue 51, and may notify monitoring module 28 of the number of remaining pending commands in command queue 51. Monitoring module 28 may then again communicate a request for pending commands. Remote site 14 may return more of the pending commands from command queue 51. This process may continue until command queue 51 at remote site 14 is empty.

Remote site 14 may provide commands to monitoring module 28 using any suitable algorithm. For example, remote site 14 may return commands using first-come, first-serve, round robin, first-in, first-out, weighted prioritization, or any other suitable algorithm. Remote site 14 may also proactively inform monitoring module 28 that commands are waiting in queue 51. Monitoring module 28 may then poll remote site 14 and retrieve commands from remote site 14 until the queue is empty.

Whereas polling process 50 is used by remote site 14 to effect state changes in devices 32 via monitoring module 28, monitoring module 28 may use heartbeat process 52 to update device state information at remote site 14. A heartbeat may be a periodic communication from monitoring module 28 to remote site 14 containing updated state information for devices 32 associated with monitoring module 28. In one suitable heartbeat process 52, monitoring module 28 may send a communication to remote site 14 in response to a change in state of a device 32, a synchronization of a device 32 with remote site 14, a triggered alert event, or in response to any other suitable event. In such a heartbeat operation 52, all data intended to be transmitted to remote site 14 may be transmitted to remote site 14 via communications network 16. Remote site 14 may transmit an acknowledgment of receipt and successful processing of the data back to monitoring module 28.

Remote site 14 may direct monitoring module 28 to make changes in its own state by, for example, posting commands to data store 51. For example, remote site 14 may post commands that set or modify the polling 50 or heartbeat 52 time intervals. Upon reaching the end of the current polling interval, monitoring module 28 may send a communication to remote site 14, requesting any queued commands. Monitoring module 28 may continue to poll, using a preselected communication scheme, until the queue of commands waiting for monitoring module 28 is empty. Each command received from the queue may be acted upon when the command is received and any associated state changes are effected. Remote site 14 may transmit an acknowledgment of receipt and successful processing of the data back to monitoring module 28.

If desired, remote site 14 may send unsolicited communications to monitoring module 28. Remote site 14 may send communications to, for example, set or update the heartbeat or polling time, or to cause monitoring module 28 to issue a command to update a component of a device. Remote site 14 may send unsolicited communications to monitoring module 28 for any other suitable purpose.

In addition to maintaining the polling and heartbeat operations and exchanging communications for events, data, and commands 54 with remote site 14, monitoring module 28 may also take care of many network level activities 56. These activities may include, but are not limited to verifying passwords, dialing up an ISP, if necessary, periodically uploading accounting/billing information, and performing security measures. Any other suitable network level activities may be performed by monitoring module 28.

The system depicted in FIGS. 1–3 illustrates a complex data transfer system wherein data is being generated and transferred between various entities. For example, data is being generated by the connected devices 32–32*d* and the service broker in normal operation as commands are executed. This data is transferred to the database server 48, where it is stored in records 94–94*d*. The virtual representation for each controlled device can be generated by querying the records 94–94*d* in the database 48 and generating a device interface web page on the web server 46.

A user, using the web browser 26 of client 22, is able to retrieve the device interface web page via the communications network 16 and manipulate the controls therein to issue commands to the service broker and connected devices. In this system, the records in the database, the generated device interface, and the viewed instance of the web page are all interrelated data related entities and need to be synchronized with the latest data from the database to maintain state. For example, the records in the database need to be periodically updated with the latest state of the connected devices and service broker. The device interface web pages need to be periodically regenerated using the most up-to-date data in the databases. The web page being viewed by the user in his browser needs to be periodically refreshed with the latest generated device interface web page.

The present invention is concerned with providing a system and method for adaptively determining and setting an appropriate refresh interval for synchronizing a data source and a data using entity that uses the data source's data.

Figure 4:
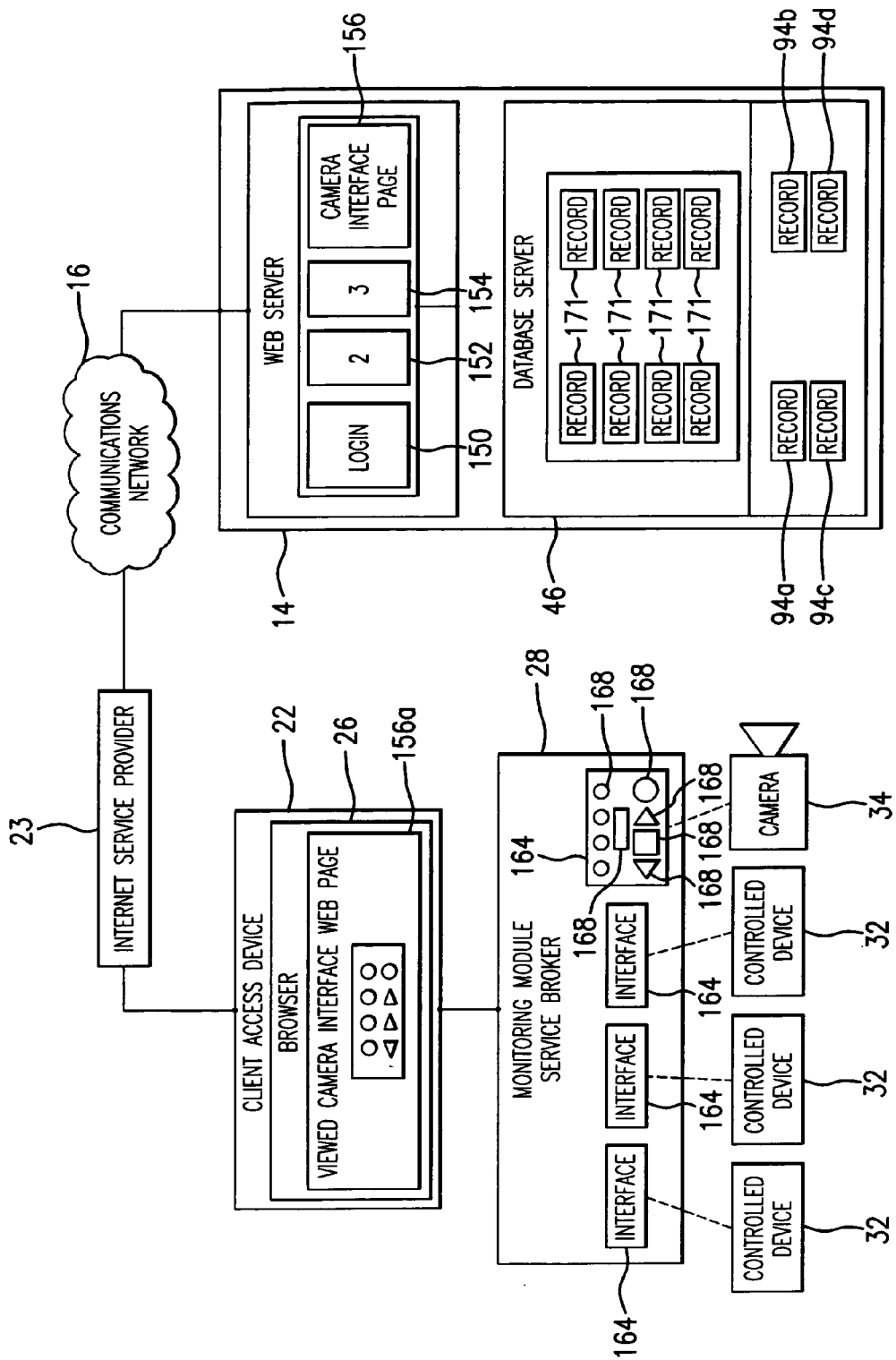
FIG. 4 is a schematic view of a preferred embodiment of an adaptively controlled resource in accordance with the present invention.

To aid in the understanding of the concepts of the invention, in FIG. 4 a simplified schematic of a data transfer system in accordance with the present invention is illustrated. A client 22 is connected to a server 14 via the communications network 16 which is a stateless viewing medium, such as the Internet. The client 22 typically is a computer that is networked to the communications network 16 via an ISP 23. The client 22 also has a data viewing program, such as an Internet browser 26, for displaying data, such as a web page 156a.

The present invention also contemplates that a monitoring appliance or service broker 28 is attached to the client computer 22. A plurality of connected devices or data generators 32 are connected to the monitoring appliance 28 as described in greater detail above. The data generators 32 are any suitable controlled devices that generate data, such as sensors or the like. To illustrate the concepts of the present invention, one of the data generating devices will be illustrated as a video camera 34 that is capable of capturing, recording, and broadcasting/streaming digital video over the communications network 16.

The service broker 28 also includes one or more device interfaces 164 for controlling a data generator. Each interface 164 includes one or more controls 168 which correspond to the physical, analog, digital, or software controls of one of the data generators 32, service broker 28, or some other control associated with one of the data generators. For example, the interface 164a controls the camera 34. The camera interface 164a includes one or more controls 168 which include i) controls for starting and stopping the recording of video and taking still pictures, ii) sliders for adjusting contrast, brightness, saturation, exposure, gain, and white balance, and iii) controls for adjusting the size and frame rate of the video stream.

As described in greater detail above, the server 14 would typically include a web server 46 and a database server 48. The web server is capable of serving up web pages to the client browser 26 as requested. For purposes of understanding the present invention, the web pages are dynamically generated from data contained in the database server 48. Of course, the web pages can be generated from other suitable sources as known to those skilled in the art. The camera interface 164 is stored as a record 170 in the database server 48, as are the individual records 171 for each of the camera controls 172 that are included in the interface 164. Of course, it should be understood that the device interface 164 is modifiable to include different arrangements and numbers of particular controls 168.

The client 22 may be registered with or logged in to the server 14, or otherwise identified and tracked by the system before the system services are available to be used. To effect the login with the server 14, the client 22 typically enters the login page 150 served-up on the web server 46 and the user enters its appropriate user login identification and password. The login identification may also include other suitable authentication schemes, such as fingerprint identification, smart card, or the like. Once the client 12 is logged into the system, he can access the other pages 152, 154, 156 that reside on the web server 46. In the present embodiment depicted in FIG. 4, for illustrative purposes, it is assumed that the user must first visit pages 152 and 154 before page 156 can be visited. Of course, other access paths to the page 156 are contemplated and would be suitable for purposes of the present invention.

As such, in the present system, the identity of the clients and the clients' usage patterns are known, can be recorded, and may be tracked by the server and/or ISP. The ability to perform these tasks is afforded by the fact that all of the clients are identified in the system and/or ISP and can be tracked, at least in part, by their identification information. Of course, it should be understood that system and/or environmental characteristics alone could also be used, if the client data is not available or in a particular system or if the client data is not needed for a particular set of criteria. In addition, since the clients communicate solely with the servers and via the ISP, it is also possible to track and take into account the load on the servers, the servers' processing load, and the ISP's network traffic. Additionally, it is also possible to keep track of the network status of the global computer network and factor the congestion of the network into this scheme. In this way, the present system can draw on its knowledge of the client, the client's applications and data generators, the server, and the network to more efficiently set the refresh interval for entities having access to data from the various data sources.

In operation, the client 22, using an Internet browser 26, logs into the server 14 by accessing the login page 150 residing on the web server 46. Thereafter, the client 22 visits the introductory pages 152 and 154 before the client eventually arrives at the virtual camera interface page 156 which contains the virtual camera interface 164. Once the client 22 reaches the virtual camera interface page 156, he would then be able to control the camera 34 via the virtual camera interface 164 to change the state of the camera and the records associated with the camera stored in the database 48. For example, the user could manipulate the virtual brightness control 168 of the video camera 34 to change the brightness level of the video camera. Manipulating the virtual brightness control sends a command indirectly to the service broker 28 to change the brightness level of the camera 34. Once the brightness level has been changed in the camera, an update command is sent to the database to change the associated brightness control record 171 of the camera 34.

To control the camera 34, the virtual camera interface page 156 is generated which includes the virtual camera interface 164. A client 22 controls the camera by viewing the web page 156 with the data viewer or web browser 26 and manipulating the virtual camera interface 164 contained therein. The web page can be transmitted to the client using any suitable technology, including push technology. This viewed instance of the page 156 is referred to by reference numeral 156a and represents a particular instance of the web page 156 at a particular point in time, or otherwise generated using a particular set of data.

When the user manipulates the camera controls 168, commands are issued to the camera 34 via the server 14, as described in greater detail above. These commands typically result in a change to the state of the camera, like the brightness level. Changes in the state of the camera 34 are transmitted to the database server records 171 associated with the camera 34, and the records 171 are updated to reflect the current state of the camera 34.

At this point, both the data used for the web page 156, which is either a dynamically generated page or a static page stored on the server 14, and the data contained in the viewed web page 156a in the client's browser are different. The viewed web page 156a and the data contained therein are now stale and must be refreshed with the current data stored in the database 48 and/or the latest instance of the web page 156.

The time period between the synchronization or refresh of data between a data source and entity which uses the data is the data refresh interval. Having a refresh interval set too long in comparison to the interval between the data changes in the data source can result in stale data being used by the data entity, whereas setting the refresh interval too short can result in an inefficient utilization of processing power and/or network bandwidth because data is being processed and transmitted unnecessarily.

The present invention is directed to providing a system and method for adaptively determining and setting a desired interval for refreshing a data user or data using entity, such as a viewed web page or a web page that is dynamically generated by changed data. The terms "data using entity" and "data user" contemplates any entity that utilizes data from a data source. By the teachings of the present invention, the refresh interval is determined adaptively or proactively based upon one or more monitored criteria. Of course, the teachings of the present invention are also applicable to any system having a data source in communication with a data using entity, but are particularly useful in determining the refresh interval for accurately displaying, in a stateless medium, the state of a module or data generator having a changing state. The teachings of the present invention are also particularly useful for generating a current view of a state of a module or a data generator.

In order to ensure that the data associated with the camera 34 in the database 48, the stored virtual camera interface page 156, and the viewed interface page 156a are current and reflect the most current state of the video camera 34, a suitable data refresh process is effected for each data user or entity. For example, a call to the COM object for refreshing the displayed page of a web browser can be programmed to occur at a particular refresh interval. As another example, a web page can be programmed or scripted to be dynamically generated by querying the database for updated data at the conclusion of the refresh interval. Many other refresh processes are suitable and within the level of ordinary skill in the art.

In determining and setting the refresh interval for an entity, any combination of the following criteria can be taken into account:

1. The likelihood that a data using entity will receive a large amount of data. For example, if the client 22 is not presently logged into the web site, then it is unlikely that the client 22 will be receiving much data from the server 14 or from a device under the client's control, such as the video camera 34. As such, the client's refresh interval can be set longer. Similarly, if the user has logged into the system by entering the appropriate data on the login page 150, the likelihood that he may be receiving data from the system is increased and the data's refresh interval likewise is shortened. Similarly, the presence or absence of a data generator in a system can affect the amount of data generated and, thus, the amount of refreshes required. For example, if a particular data generator is offline, the data refresh interval for that data using entity associated with that offline data generator can be set longer.

2. The available bandwidth of the communications network. For example, if many users logged onto the server 14 and/or the ISP 23 generally using the communications network 16, the available bandwidth of the communications network would likely be affected. In the case where many users are logged into the global computer network and the available bandwidth is lower, a longer refresh interval may be issued to each data using entity to reduce the amount of data transferred.

3. The closeness of the client to the part of the web site containing a large source of data which needs refreshing. For example, once a user has logged into the system, and travels closer to the virtual camera interface page 156 by accessing introductory pages 152 and 154, the data using/viewing entity employed by this user can have its refresh interval shortened and transmitted to the client in anticipation of increased upcoming data transmissions.

4. The ability of the server to process the data. For example, if many clients were logged onto the server 14 and using a large portion of the processing power of the server 14, the refresh interval for each client's data using/viewing entity can be lengthened to alleviate some of this burden, so as not to overload the processing power of the server 14.

5. Client usage patterns. For example, if a particular user has logged in to the system at noon consistently during the past week, it is likely that this particular user will be logging on again today at noon and receiving data. In such an instance, this particular client's refresh interval could be pro-actively shortened at noon in anticipation that it will again log on and receive data. Similarly, if clients located on the east coast of the United States do not log on to the server 14 during normal sleeping hours, i.e., between 12:00 a.m. and 7:00 a.m., the refresh interval from those clients could be lengthened since it is unlikely that data would be sent by them during this time. Similarly, the interval between the user's logins may be indicative of the amount of upcoming transmissions of data, i.e., a user that has not logged in for some time may be likely to generate more transmitted data than a user who logs in frequently. Of course, the converse can also be true for certain systems. Also, if a user is viewing data that is related to the data that needs to be refreshed, the refresh interval could be shortened.

6. Database Usage Patterns. For example, if update patterns of the database indicate that the user's view or use of a web page or other data needs to be updated, the refresh interval can be modified to accommodate this need. Similarly, the interval between data updates could indicate a need for a modified data refresh interval.

7. The Nature of the Data. For example, frequently changing or sensitive data might call for a shorter data refresh interval.

It should also be understood that other quality of service issues may also be factored into the above-mentioned scheme to allow the system to modify the data refresh interval for a data using entity. In addition, other criteria similar to those set-forth above are contemplated and could be employed as part of the present invention.

It is contemplated that all or some of the afore-mentioned criteria would be used in any conventional algorithm, such as a statistical averaging scheme which accounts for each of the criteria proportional to their importance and effect on the data transfer system. In this way, the methods and systems of the present invention for controlling the refresh interval are responsive and pro-active, instead of being limited to responding to only past conditions.

Preferably, the monitored criteria is monitored using any suitable sensor that is appropriate for collecting and making the monitored criteria data available to the processor that processes the adaptive algorithm. For example, a thermocouple in communication with the server 14 may be used to pass temperature data to the algorithm processor of the server 14. Of course, any suitable processor capable of processing the desired adaptive algorithm and receiving the monitored criteria data from the sensors is also within the scope of the present invention. Such sensors and processor are described in U.S. patent application Ser. No. 09/684,013 filed on Oct. 6, 2000 and entitled "Adaptively Controlled Resource and Method of Controlling the Behavior or Same" which is hereby incorporated herein by reference.

Of course, the teachings of the present invention are applicable to other systems that would benefit from adaptive data-refreshing, such as an email page that refreshes adaptively based on the frequency of email received or the times of day that email likely comes in, a system that reports stock quotes being updated more frequently when market activity is high or when trading ranges are predicted to be high, or the like.

While certain preferred embodiments and various modifications thereto have been described or suggested, other changes in these preferred embodiments will occur to those of ordinary skill in the art which do not depart from the broad inventive concepts of the present invention. Accordingly, reference should be made to the appended claims rather than the specific embodiment of the foregoing specification to ascertain the full scope of the present invention.

What is claimed is:

1. A method for adaptively setting a data refresh interval comprising:
   providing a data source;
   providing a data using means for utilizing data from the data source, the data using means having an initial refresh interval;
   providing a communication link between the data source and the data using means;
   monitoring at least one criteria related to the refresh interval;
   generating an updated data refresh interval based at least in part on the monitored criteria;
   transferring the updated refresh interval to the data using means; and
   changing the initial data refresh interval of the data using means to the updated data refresh interval.

2. The method set forth in claim 1, wherein the communication link comprises a network.

3. The method set forth in claim 2, wherein the network is a global computer network.

4. The method set forth in claim 1, wherein the data using means is a web browser.

5. The method set forth in claim 1, further comprising a database for storing the data received from the data source.

6. The method set forth in claim 5, further comprising providing a means for generating at least one display page based at least in part on the data stored in the database and which is viewable on the data using means.

7. The method set forth in claim 6, wherein the at least one display page is pushed to the data using means.

8. The method set forth in claim 1, further comprising providing a means for generating at least one display page based at least in part on the data from the data source and which is viewable on the data using entity.

9. The method set forth in claim 8, wherein the at least one display page is pushed to the data using means.

10. The method set forth in claim 1, wherein the at least one criteria is selected from the group comprising the likelihood that the data using entity will receive a large amount of data, the available bandwidth of the communication network, the closeness of the client to the part of the web site containing a source of data, the ability of the server to process data, client usage patterns, database usage patterns, and the nature of the data.

11. The method set forth in claim 1, wherein the monitored criteria is used in an adaptive algorithm to determine the updated refresh interval.

12. The method set forth in claim 1, wherein the updated refresh interval is transmitted to the data using means.

13. The method set forth in claim 1, wherein the data using means uses the updated refresh interval to determine when to refresh the data using means.

14. The method set forth in claim 1, wherein the data using means requests data from the data source.

15. The method set forth in claim 1, further comprising providing a data server in communication with the data source and data using means, wherein the data server generates and transmits the updated refresh interval in response to the request for data by the data using means.

16. The method set forth in claim 15, wherein a subsequent request for data by the data using means is based at least in part on the updated refresh interval.

17. The method set forth in claim 1, wherein the data using means is a visual display, an audible display, or a tactile display.

18. An adaptively refreshed data using system of a service broker system for interactive monitoring and control of data to and from computers and Internet enabled devices of a client/server safety system over the Internet comprising:
   a data source;
   a data using means for utilizing data from the data source, the data using means having an initial refresh interval;
   a communication link between the data source and the data using means;
   a criteria monitor for monitoring at least one criteria related to the refresh interval;
   a processor for generating an updated data refresh interval based at least in part on the monitored criteria; whereby the updated data refresh interval is transferred to the data using means and the data using means is updated based on the data refresh interval.

19. The system set forth in claim 18, wherein the communication link comprises a network.

20. The system set forth in claim 19, wherein the network is a global computer network.

21. The system set forth in claim 18, wherein the data using means is a web browser.

22. The system set forth in claim 18, further comprising a database for storing the data received from the data source.

23. The system set forth in claim 22, further comprising a means for generating at least one display page based at least in part on the data stored in the database and which is viewable on the data using means.

24. The system set forth in claim 23, wherein the at least one display page is pushed to the data using means.

25. The system set forth in claim 18, further comprising a means for generating at least one display page based at least in part on the data from the data source and which is viewable on the data using entity.

26. The system set forth in claim 25, wherein the at least one display page is pushed to the data using means.

27. The system set forth in claim 18, wherein the at least one criteria is selected from a group comprising the likelihood that the data using entity will receive a large amount of data, the available bandwidth of the communications network, the closeness of the client to the part of the web site containing a source of data, the ability of the server to process data, client usage patterns, database usage patterns, and the nature of the data.

28. The system set forth in claim 18, wherein the monitored criteria is used in an adaptive algorithm to determine the updated refresh interval.

29. The system set forth in claim 18, wherein the updated refresh interval is transmitted to the data using means.

30. The system set forth in claim 18, wherein the data using means uses the updated refresh interval to determine when to refresh the data using means.

31. The system set forth in claim 18, wherein the data using means requests data from the data source.

32. The system set forth in claim 18, further comprising a data server in communication with the data source and data using means, wherein the data server generates and transmits the updated refresh interval in response to the request for data by the data using means.

33. The system set forth in claim 32, wherein a subsequent request for data by the data using means is based at least in part on the updated refresh interval.

34. The system set forth in claim 18, wherein the data using means is a visual display, an audible display, or a tactile display.

35. A method for adaptively setting a data refresh interval between a sender computer and a receiver computer of a service broker system for interactive monitoring and control of data to and from computers and Internet enabled devices of a client/server safety system over the Internet comprising:
 providing a data source;
 providing a data using means for utilizing data from the data source, the data using means having an initial refresh interval;
 providing a communication link between the data source and the data using means;
 monitoring at least one criteria related to the refresh interval;
 generating an updated data refresh interval based at least in part on the monitored criteria;
 changing the initial data refresh interval of the data using means to the updated data refresh interval; and
 providing a data server in communication with the data source and data using means, wherein the data server generates and transmits the updated refresh interval in response to the request for data by the data using means and wherein a subsequent request for data by the data using means is based at least in part on the updated refresh interval.

36. An adaptively refreshed data using system of a service broker system for interactive monitoring and control of data to and from computers and Internet enabled devices of a client/server safety system over the Internet comprising:
 a data source;
 a data using means for utilizing data from the data source, the data using means having an initial refresh interval;
 a communication link between the data source and the data using means;
 a criteria monitor for monitoring at least one criteria related to the refresh interval;
 a processor for generating an updated data refresh interval based at least in part on the monitored criteria;
 whereby the data using means is updated based on the data refresh interval; and
 a data server in communication with the data source and data using means, wherein the data server generates and transmits the updated refresh interval in response to the request for data by the data using means, and wherein a subsequent request for data by the data using means is based at least in part on the updated refresh interval.

37. A method for adaptively setting a data refresh interval comprising:
 synchronizing a data source and a data using device by performing at least one of a polling operation, a heartbeat operation, an exchange of event data, and a network level activity;
 requesting a refresh of data from the data source to the data using device based at least in part by an initial refresh interval, the refresh of data being requested by the data using device;
 monitoring at least one criteria related to the refresh interval;
 generating an updated data refresh interval based at least in part on the monitored criteria;
 transferring the updated refresh interval to the data using device;
 changing a data refresh interval of the data using device from the initial data refresh interval to the updated data refresh interval; and
 requesting a subsequent refresh of data from the data source based at least in part on the updated refresh interval, the subsequent refresh of data being requested by the data using device.

38. A system for adaptively setting a data refresh interval comprising:
 a data source;
 a data using device adapted to use data from the data source, the data using device having an initial refresh interval;
 a communication link arranged between the data source and the data using device;
 a monitoring arrangement adapted to monitor at least one criteria related to the refresh interval and adapted to synchronize the data source and the data using device by performing at least one of a polling operation, a heartbeat operation, an exchange of event data, and a network level activity;
 a processor adapted to generate an updated data refresh interval based at least in part on the monitored criteria; and
 an arrangement adapted to transfer the updated refresh interval to the data using device;
 wherein the data using device is adapted to request a refresh of the data from the data source based at least in part on the updated refresh interval.

* * * * *